March 14, 1950        E. PLATTER        2,500,862
SAW SETTING TOOL
Filed March 2, 1948        2 Sheets-Sheet 1
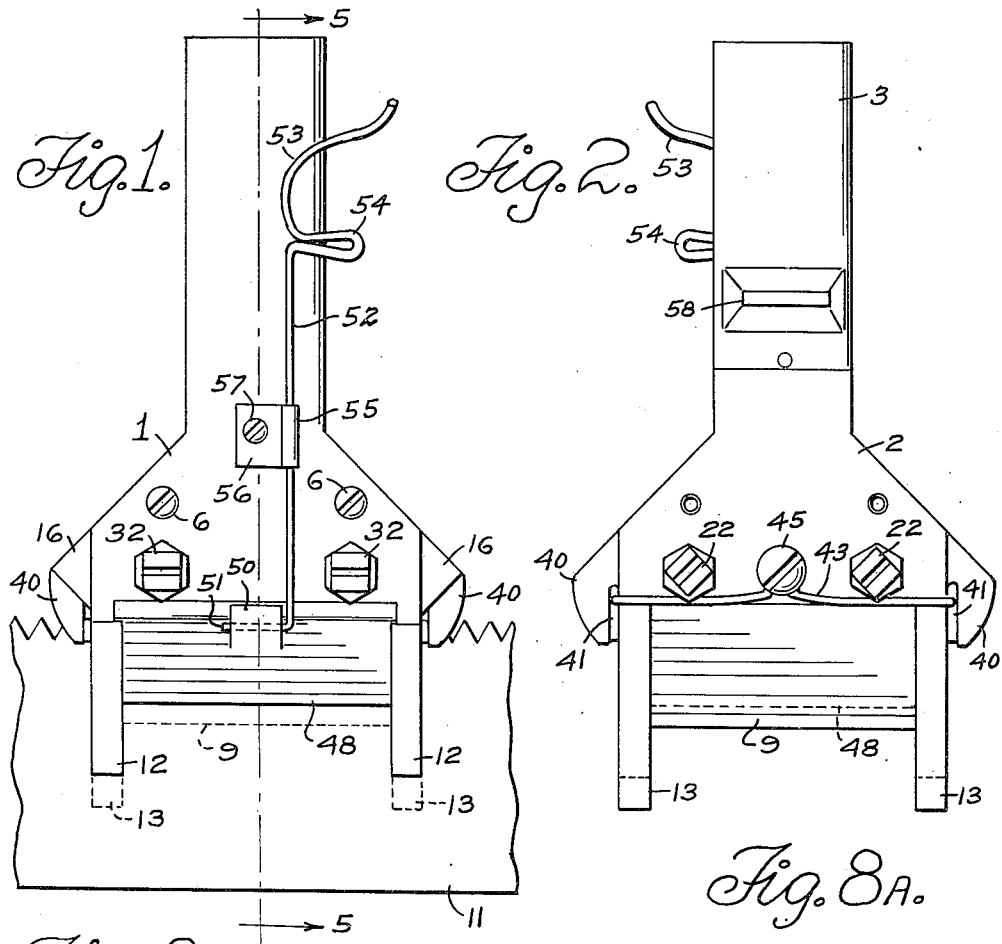
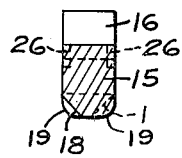
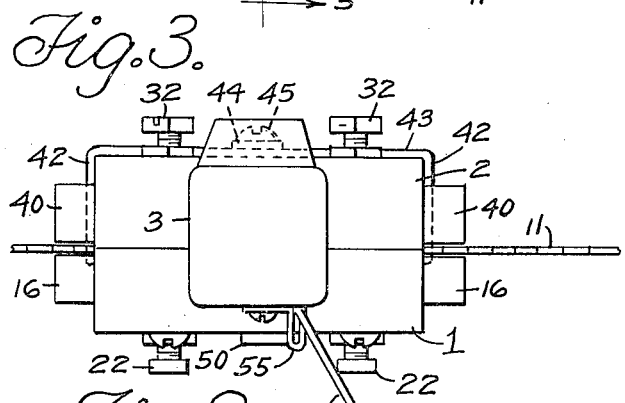
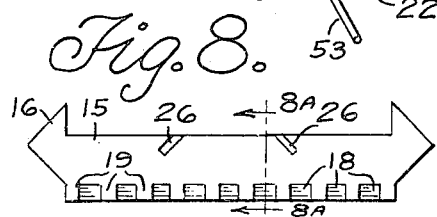
INVENTOR.
Edgar Platter
BY Victor J. Evans & Co.
ATTORNEYS

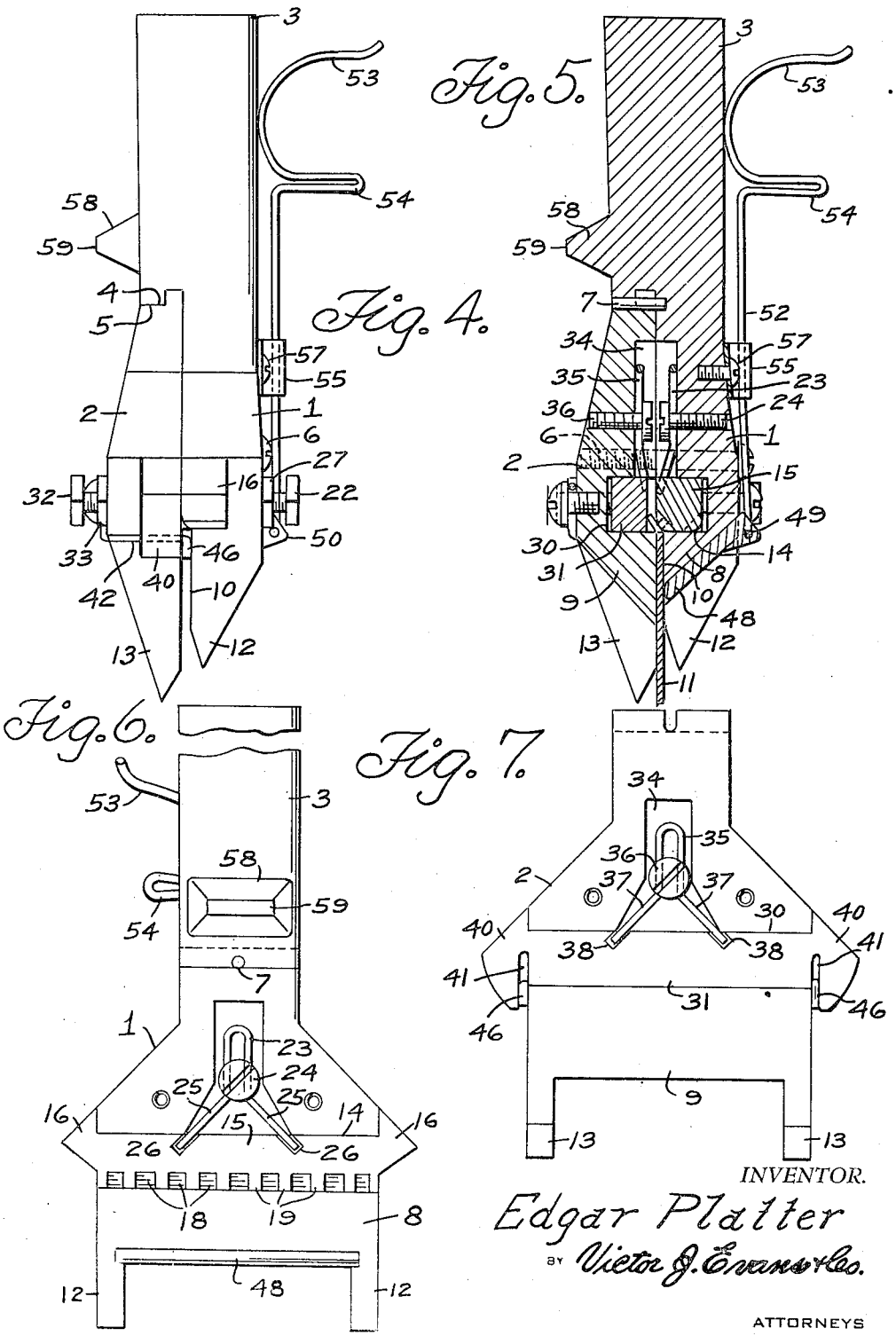

Patented Mar. 14, 1950

2,500,862

UNITED STATES PATENT OFFICE 2,500,862

SAW SETTING TOOL

Edgar Platter, Roswell, N. Mex.

Application March 2, 1948, Serial No. 12,559

6 Claims. (Cl. 76—72)

The present invention relates to a saw setting tool, and in particular to a saw setting tool which is adapted to set a plurality of saw teeth in one operation, thereby materially saving time and tedious labor in the setting of saws of the reciprocating type.

One object of the invention is to provide a saw setting tool with an adjustable and removable saw setting bar having a series of spaced saw tooth engaging die faces which are appropriately arranged to accommodate saws with particular tooth spacing or number of teeth per inch, the saw setting bar being supported for easy removal and replacement to adapt the device to a wide range of various saws.

Another object is to provide a saw setting tool having an elongated saw setting anvil and bar arranged in opposed relation and yieldingly and slidably mounted for lateral adjustment relative to one another.

Another object is to provide a saw setting tool having an elongated saw setting bar which is provided on two or more faces with a series of tooth engaging die surfaces, with the tooth engaging die surfaces on each of said faces appropriately spaced apart to accommodate saws having different per inch tooth spacing.

Another object is to provide a saw setting tool having guide means yieldingly supported on the tool with offset portions adapted to project transversely between a pair of adjacent saw teeth to enable the correct and proper positioning and re-positioning of the saw setting tool between setting operations.

Another object is to provide a saw set with an elongated saw tooth setting bar which is reversibly mounted and is provided on opposite sides with a series of saw tooth engaging die faces, each series being differently spaced, thus providing two saw setting surfaces adapted to accommodate saws with different tooth spacing.

Another object is to provide a saw setting tool with manually operable saw engaging and retaining means adapted to engage the side of the saw and hold the saw setting tool in proper relation with respect to the saw during the bending action.

In the drawings:

Figure 1 is a side elevational view of the saw setting tool, showing the manner in which the same is applied to a saw during the setting operation and illustrating the manually operable retaining and holding means.

Figure 2 is a side elevational view of the saw setting tool, showing the yieldingly mounted positioning guide and the manner in which the same is adapted to yieldingly engage between adjacent saw teeth at each end of the saw setting tool.

Figure 3 is a top elevational view of the saw setting tool, showing further the manner in which the device is adapted to straddle a saw during the tooth setting operation.

Figure 4 is an edge elevational view of the saw setting tool showing the saw receiving recess and saw gauging or guide wires projecting thereinto.

Figure 5 is a longitudinal cross sectional view taken on line 5—5 of Figure 1 and looking in the direction of the arrows illustrating various details of construction and the location of the yieldably and slidably mounted saw setting bar and anvil.

Figure 6 is a side elevational view of the saw setting tool showing one of the divided sections removed to illustrate the shape of the saw setting bar.

Figure 7 is a side elevational view of the other divided tool section, showing the saw setting anvil and the manner in which the same is mounted.

Figure 8 is a side elevational view of one of the removable saw setting bars, showing the series of spaced apart saw tooth engaging die surfaces along one side of the bar and, Figure 8a is a transverse cross sectional view of the saw setting bar showing the beveled surface of one of the series of spaced apart die faces on one side of the saw setting bar in full lines and showing the beveled surface of one of the series of die faces on the other side of the saw setting bar in dotted lines.

In the drawings and referring more in detail, the saw setting tool is shown as comprising a pair of separably connected sections 1 and 2. The section 1 is provided with a shank 3 having an undercut shoulder 4 for receiving a correspondingly spaced end portion 5 on the upper end of the section 2. A screw 6 is provided for retaining the sections 1 and 2 of the saw setting tool in mutual engagement, and a guide pin 7 is adapted to prevent relative shifting of the sections about the axis of the screw 6.

The lower portion of each of the sections 1 and 2 is fashioned to provide jaws 8 and 9, and the jaw 8 is cut away as at 10 to provide a recess for receiving a saw 11 (Fig. 5). In order to guide the jaws 8 and 9 during positioning of the saw setting tool on the cutting edge of a saw, each jaw is provided adjacent the ends with pointed projections 12 and 13 respectively. The points of the projections are arranged to guide the saw 11 therebetween and direct the edge into the saw receiving recess between the jaws 8 and 9.

Formed on the inner surface of the section 1 of the saw setting tool and adjacent the upper end of the saw receiving recess or cut away portion 10 is a transversely extending socket 14 which is adapted to slidably receive a saw setting bar 15, the ends of which terminate in ears 16 arranged to embrace the corner and side edges of the saw setting tool section 1 and prevent endwise sliding movement of the saw setting bar when the same is in operative position. The saw setting bar is elongated and is provided along at least two opposed faces with a series of spaced apart beveled surfaces 18, thus forming intermediate tooth engaging die surfaces 19. The tooth engaging die surfaces 19 are slightly rounded on their lower edges as at 20 (Fig. 8a) and are adapted to engage alternate saw teeth and forcibly bend the same in a direction away from the die faces 19.

The saw setting bar is mounted in the cut away slot 14 for lateral sliding movement and adjusting screws 22 are threaded in suitable spaced apart openings in the section 1 so that the inner ends will engage the end portions of the saw setting bar and urge the bar inwardly against the yielding action of a U-shaped spring member 23 which is affixed to the saw setting tool section 1 by means of a retaining screw 24, (Fig. 6). The inner surface of the section 1 is cut away as at 25 to provide a cavity of sufficient size to facilitate mounting of the U-shaped spring, and said cut away portion is formed directly above the transverse slot 14 so that the outwardly bent ends 25 of the spring will be received in openings 26 extending inwardly from the corner edge of the saw setting bar 15. Lock nuts 27 are threaded on the adjusting screws 22 to enable the adjusting screws to be retained in their adjusted position and thus provide a rigid back support for the jaw setting bar 15.

Similarly, the inner surface of the saw setting tool section 2 is cut away as at 30 to form a transverse slot in which is slidably mounted a saw set anvil bar 31 (Fig. 7). The anvil bar 31 is of square section and is arranged in opposed relation to the saw setting bar 15 so that the ends of the saw teeth will engage said anvil during the bending operation. The section 2 is also provided with openings for receiving adjusting screws 32 having lock nuts 33 for retaining the screws in an adjusted position and likewise the anvil bar 31 since the inner ends of the adjusting screws engage the end portions of said anvil bar and retain the same in an adjusted position.

The inner surface or mutual engaging surface of the section 2 is cut away as at 34 for receiving a U-shaped spring member 35 which is held in position by means of a screw 36 having an enlarged head similar to the spring retaining screw 24. The free ends 37 of the spring member 35 project into the slot 30 and are received in recesses 38 formed in the anvil bar 31. Thus, the anvil bar is yieldingly supported within the slot 30 and urged in a direction toward the adjusting screws 32.

Formed at each end of the saw setting anvil bar 31 is a hook shaped projection 40 having a vertical slot 41 for receiving the angularly bent ends 42 of a gauge or guide wire 43. The gauge or guide wire 43 is looped as at 44 for receiving an anchoring screw 45 and the extreme free ends of the gauge or guide wire are bent downwardly as at 46 at each end of the saw setting tool in registry with the saw receiving recess 10. Thus, the free ends 46 will engage between adjacent saw teeth and guide the saw setting tool to a proper position longitudinally of the saw 11.

In order to hold the saw setting tool in place during the tooth bending or setting action, a clamping plate 48 is pivotally connected to the tool section 1 between the pair of projections 12 by suitable pivot pins 49 (Fig. 5). A lug 50 is formed integral with the clamping plate 48 and said lug is provided with an opening for receiving the lower bent end 51 of a manual operating rod 52. The upper end of the manual operating rod is fashioned into a handle portion 53 and is further bent upon itself as at 54 to provide a finger engaging portion. The intermediate portion of the manual operating rod 52 is slidably guided by a looped guide bracket 55 affixed to the section 1 of the saw setting tool by means of a screw 57.

The shank 3 is formed with a laterally extending projection 58 which tapers toward a surface 59, and said projection is adapted to be used for striking isolated saw teeth which are not bent at the correct angle, and do not coincide with the V formed by the remaining teeth when the set saw edge is viewed longitudinally.

It is proposed, to form the tooth engaging surfaces 19 such that they will be spaced correctly for saws having a predetermined number of teeth to the inch. Thus, if it is desired to set a saw having 8 teeth to the inch, a setting bar 15 is selected which has a corresponding number of tooth engaging faces 8 per inch. In operation, the saw 11 is supported in a vise or the like with its cutting edge uppermost. The saw setting tool is then adjusted to correctly position the setting and anvil bars 15 and 31 so as to obtain the proper saw tooth set for a particular saw or one having a predetermined number of teeth to the inch.

Having selected the correct saw setting bar, the setting bar and anvil are then adjusted by manipulation of the adjusting screws 22 and 32 to position said setting bar and anvil in proper spaced apart relation to produce the desired saw tooth set.

The saw 11 is then supported in a suitable vise and the saw setting tool is then applied to the toothed edge thereof by moving the tool downwardly so that the saw enters the slot 10 with the alternate teeth engaged by the tooth engaging surfaces 19 and the intermediate teeth received in the beveled cut away portion 18. It is to be noted, that the guide or gage wire ends 46 will engage between adjacent teeth at each end of the saw setting tool so that all of the tooth engaging faces 19 will be arranged in their proper position with respect to the teeth to be set. After the saw setting tool has been thus placed in position, the handle 53 is pushed downwardly to forcibly urge the clamping plate 48 into tight clamping engagement with the saw 11. The saw setting tool is now in position for setting the saw teeth and by striking a blow on the shank 3 with a hammer or the like, the alternate saw teeth will be bent or set to the proper tooth angle.

After a series of saw teeth have been set, the saw setting tool is re-positioned with respect to another series of unset teeth and the operation repeated as above set forth. When the saw teeth have been set on one side of the saw, the saw setting tool is removed and reversed so that the alternate teeth may be set by a series of the above repeated operations.

The separately connected sections 1 and 2 are easily separated by removing the screws 6, thus enabling easy repositioning of the saw setting tool without disturbing the position of the saw setting bar or anvil.

Should it be desired to set a saw having 7 teeth per inch, the saw setting bar 15 is reversed to bring the tooth engaging faces on the opposite side into operative position. It is intended to provide a number of saw setting bars 15, each having two series of saw tooth engaging surfaces, one series on each side of the bar of different linear tooth engaging surface spacing to facilitate the setting of a wide range of saws having variously spaced saw teeth. By thus providing a set of saw setting bars 15, each with two series of saw tooth engaging surfaces spaced to accommodate different saws with corresponding tooth spacing it will be found that considerable time and labor will be saved since in contrast to the prior methods wherein only one tooth is set at a time, a large number of the saw teeth will be set in a single operation.

I claim:

1. In a saw setting tool, a body portion having a saw receiving slot and a pair of opposed recesses at one end of the slot, a saw setting bar yieldingly and adjustably mounted in one of said recesses having a series of spaced cut away saw tooth receiving portions defining a series of saw tooth engaging surfaces between said cut away portions, an anvil yieldingly and adjustably mounted in the other of said recesses with its anvil surface slightly spaced from the saw tooth setting and engaging surfaces, and a positioning guide supported by the body portion arranged to project between adjacent saw teeth so that the saw tooth engaging surfaces of the saw setting bar will be alined with alternate saw teeth within said slot.

2. The invention as in claim 1 wherein a manually operated saw engaging and clamping plate is arranged on the body portion for clampingly engaging a saw when the saw setting tool is positioned thereon.

3. The invention as in claim 1 wherein said body is provided with a shank at one end and a projection is formed on the shank and adapted to be used as a hammer.

4. In a saw setting tool, a pair of separably connected body sections shaped at one end to define a saw receiving slot, each of said sections being provided with mutually opposed recesses located at the inner end of said saw receiving slot, a saw setting bar adjustably mounted in one of said recesses having a series of spaced tooth engaging surfaces arranged to engage alternate saw teeth, an anvil adjustably mounted in the other of said recesses in spaced relation to said saw setting bar, manually operable clamping means on one of said sections for clampingly engaging the side of a saw, and guide means carried by the other section for being received between adjacent saw teeth and thereby aline said tooth engaging surfaces with alternate saw teeth.

5. In a saw setting tool, a body portion having a saw receiving slot at one end terminating at the inner end in a pair of opposed slots, a saw setting bar having a series of saw tooth engaging portions adjustably mounted in one of said slots, a saw setting anvil adjustably mounted in the other of said slots and yielding spring means for supporting said saw setting bar and said anvil.

6. In a saw setting tool, a body portion having a saw receiving slot at one end terminating at the inner end in a pair of opposed slots, a saw setting bar having a series of saw tooth engaging portions adjustably mounted in one of said slots, a saw setting anvil adjustably mounted in the other of said slots, said saw tooth engaging portions being spaced to engage alternate saw teeth and yielding spring means for supporting said saw setting bar and said anvil.

EDGAR PLATTER.

REFERENCES CITED

The following references are of record in the file of this patent:

UNITED STATES PATENTS

| Number | Name | Date |
|--------|------|------|
| 969,446 | Turner | June 7, 1910 |
| 1,090,035 | Dudgeon | Mar. 10, 1914 |
| 1,139,818 | Smith | May 18, 1915 |
| 2,141,695 | Platter | Dec. 27, 1938 |
| 2,409,311 | Platter | Oct. 15, 1946 |